Aug. 27, 1940.　　　　J. D. BOBBROFF　　　　2,212,873
LAWN MOWER
Filed June 22, 1938
Fig.1.
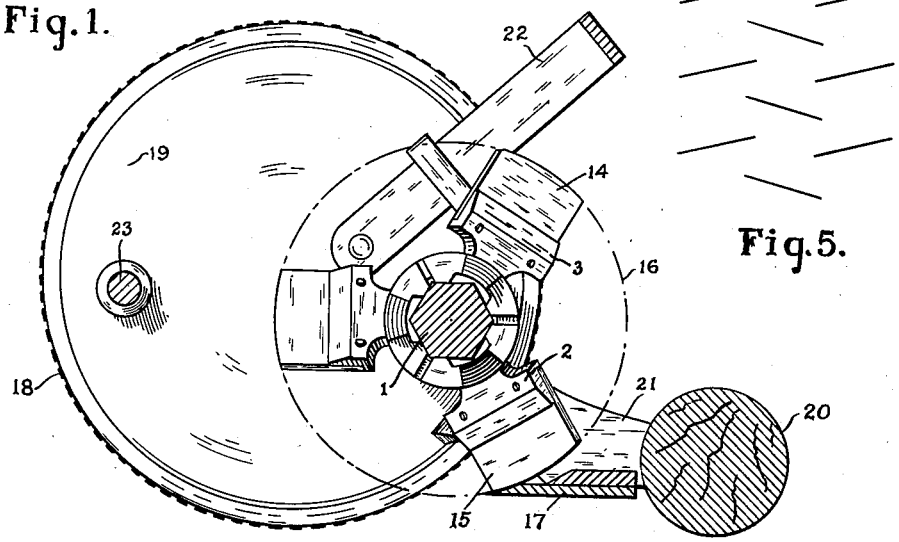
Fig.5.
Fig.2.
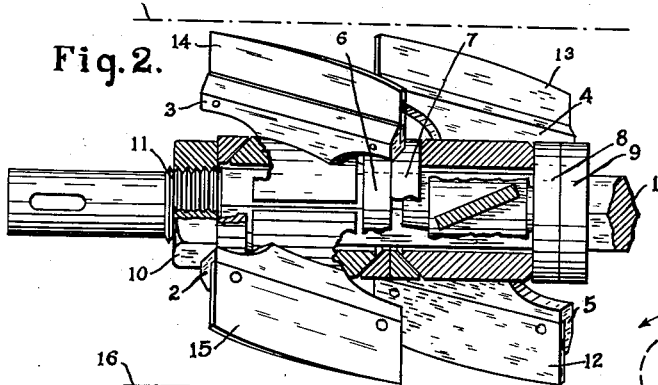
Fig.4.
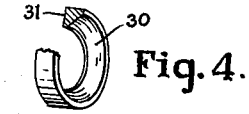
Fig.3.
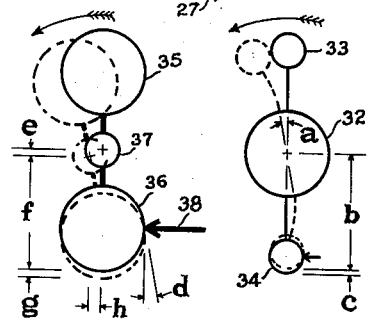
Fig.7.　　Fig.8.
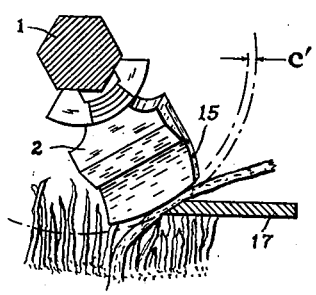
Fig.6.
Inventor:
James D. Bobbroff,
By Rudolph C. Prentice,
Attorney.

Patented Aug. 27, 1940

2,212,873

UNITED STATES PATENT OFFICE 2,212,873

LAWN MOWER

James D. Bobbroff, Portland, Oreg., assignor to Eversharp Lawnmower Co., a corporation of Nevada Application June 22, 1938, Serial No. 215,206

4 Claims. (Cl. 56—294)

My invention relates to lawn-mowers of the general type wherein a rotary cutter-head makes contact with a stationary knife to form a continuously acting shear and more particularly to that type thereof employing flat flexible blades as typified by the subject of United States Letters Patent No. 1,818,220.

The principal object of my invention is the provision of a more nearly uniform power requirement so that the cutter-head may be kept at a high speed of rotation with a given power input.

A second object is the provision of durability.

Other objects and advantages of my invention will be apparent in the following discourse wherein the significance of the reference characters in the accompanying drawing, details of construction and manner of use of a typical mower embodying my invention, and the particular advantages thereof are explained.

Figure 1 represents a view of a transverse section of the mower normal to the axis of rotation of the cutter-head.

Figure 2 represents a view of a fragment of the cutter-head partly in elevation and partly in section.

Figure 3 represents a view in perspective of a knife-carrier element.

Figure 4 represents a view of the device for retaining the knife-carriers in position, partly in radial section.

Figure 5 is a diagram representing in cylindrical projection the relative dispositions of the several cutting edges of the knives showing the staggered and alternately inclined arrangement thereof.

Figure 6 represents a view of a single knife, carrier therefor, and shaft in section, as the knife is flexed by engagement with an obstruction.

Figure 7 is a diagram illustrative of certain effects inherent in the operation of ordinary mowers.

Figure 8 is a diagram illustrative of certain effects inherent in the operation of the subject mower.

The essence of the present invention resides in the use of a relatively heavy shaft 1 of hexagonal form upon which knife carriers as 2, 3, 4, and 5, of substantial weight and size are mounted by means of retainers as 6, 7, 8, and 9, shown in detail in Figure 4, interposed in symmetrical pairs between successive groups of carriers as 2 and 3 and 4 and 5 respectively, to resolve an axial thrust imposed by a nut 10 engaged upon the shaft-threads 11, into centripetal strains serving to clamp the carriers securely to the shaft surfaces, in conjunction with flat, flexible blades as at 12, 13, 14, and 15 secured to the said carriers in alternately inclined relationship, said blades being so formed at the edges thereof as to be coincident with a cylindrical surface 16 of a radius substantially equal to the distance between the center of the shaft 1 and the cutting edge of the stationary knife 17.

In other respects the mower employs expedients of established usage in the art. A traction wheel 18 is journaled upon the frame-casting 19 and is formed with an internal gear engaging the customary pinion, not shown, to drive the shaft 1 in rotation. A roller 20 supports the stationary knife 17 upon the roller-bracket 21 and a handle structure 22 is pivotally mounted on the frame 19 in the usual manner. The foregoing, of course, being a typical construction for each of two symmetrical side units joined by the usual tie-rod 23, a detailed description of this conventional assembly is omitted.

The knife-carriers as 3 and 4 are shown in detail in Figure 5 and are characterized by these features: two symmetrically arranged conical surfaces 24 and 25, two internally disposed plane surfaces indicated at 26 and 27 inclined to form an angle therebetween of 120 degrees, a body 28 of segmentary cylindrical form, and a radially extended and longitudinally inclined arm 29 to which the flexible, flat, knife as 14 may be attached. These carriers are of two forms differentiated by opposite and symmetrical longitudinal inclinations of the arms as 29 to provide for the disposition of the knife-edges in the cylindrical surface 16 in staggered and alternately inclined relationship illustrated by Figure 5.

The retainers as 6 and 7 are shown in detail in Figure 4 and are of uniform pattern characterized by an internal conical surface 30 adapted to engage the conical surfaces as 24 and 25 of the knife-carriers as 3 and 4, and a plane surface of annular form indicated at 31 adapted for mutual contact when arranged in symmetrical pairs as 6 and 7 in Figure 2.

The retainers as 6 and 7 have an aperture of slightly greater diameter than the greatest shaft diameter to allow of the shifting of the retainers radially to make contact with the three knife-carrier cones engaged thereby when slight inequalities in the axial length of the knife-carriers must be compensated for without localizing the compressive stress of the assembly eccentrically to the shaft axis.

The particular structure set forth above, though of great utility in the assembly and maintenance of the mower, is incidental to the chief effects accruing from the arrangement considered to be the gist of the present invention.

These effects are of a dynamic order and relate to the kinetic properties of the structure in operative motion.

The greater portion of the mass of the rapidly revolving cutter-head is disposed relatively close to the axis of rotation as illustrated in Figure 8 by the circle 32 and the minor masses of the flexible blades are disposed peripherally as denoted by the circles 33 and 34 in obedience to the philosophy of minimum momentum of the aggregate rotating mass. This is in contrast to the older structures whose properties are represented by Figure 7 where the greater masses are disposed peripherally at 35 and 36 and the minor masses at 37.

The severance of the grass fibres is accomplished in this mower more by the destructive stresses attending the impact of the knife-edges moving at high velocity in conjunction with whatever shearing effect may be contributed by the movement of the blade edge across the stationary edge in actual contact therewith or in close proximity thereto, involving the destructive flexure of the engaged fibres, than by actual statical shearing by the relative movement of the edges across the stationary knife in actual contact.

Since the power requirements of a mower are definitely related to the density of the grasses and quantities thereof, an approximately uniform high velocity of the cutting edges must be provided for by either a variable power input or a variable engagement of the cutter-head with the grasses, or both.

The present invention contemplates a variable engagement of the cutter-head with the grasses and the provision therefor consists in the combination of flexible blades of a normal length adapted to wipe the stationary blade and a foreshortened length upon flexure occasioned by resistance, adapted to clear the stationary knife as illustrated in Figure 6 where the clearance is represented by the dimension c'.

Other valuable effects inherent in this structure are illustrated by comparison of the Figures 7 and 8.

In the structure represented by Figure 7, impedance of the motion of the mass 36, as by contact with the stationary knife of a mower so constructed, occasions aberrations from exact truth of rotation of the assembly represented at one extremity of the amplitude thereof by the broken line figure. It is to be observed that the mass of the entire assembly tends to become pivotal about the point of impact represented by the point of the arrow 38, resulting in the downward and lateral deflection of the entire assembly represented in magnitude by the dimensions e and g in the vertical aspect and the dimension h in the lateral aspect. As well, it should be noted, the dimension f representing the distance between the axis of rotation and the stationary knife edge, is definitely shortened, causing an increase in the force of contact of the moving knife with the stationary knife. The dimension d representing the angular motion of the cutter-head assembly must necessarily be of greatly diminished value as compared with the next previous motion in an equal period of time.

The Figure 8 represents the characteristics of the present mower. Instead of an elongation of the radial dimension of the knife-edge upon impact, the flexible blade allows of almost unretarded angular motion of the greater mass 32 and consequent shortening of the radial dimension to clear the obstruction represented by the dimension b with which the dimension c is complementary to equal the distance between the axis of rotation and the stationary knife. The angular motion of the greater centrally located mass 32 is represented by the dimension a. It is to be observed that the force of impact is greatly reduced and consequently the aberrations from exact truth of rotation of the entire assembled mass are of greatly reduced amplitudes.

It is obvious that with lesser momenta of the cutter-head, truly cylindrical form of the flexible knife-edges, more nearly uniform and high rotative speeds, and controlled power requirements, many advantages accrue which contribute definitely to the art.

Having described my invention, what I claim is:

1. The combination in a lawn-mower of a stationary knife with a coacting rotary cutter-head comprising, a hexagonal shaft, a series of knife-carriers mounted on said shaft in groups of three each formed with surfaces adapted to bear upon two adjacent sides of said shaft and with inclined extremities, annular retainers formed with inclined surfaces adapted to engage the inclined surfaces of said groups of knife carriers, means to retain the assembly of said knife-carriers and said retainers in compressive stress, and knives fixed upon said knife-carriers to wipe said stationary knife.

2. The combination in a lawn-mower of a stationary knife with a coacting rotary cutter-head comprising, a relatively heavy hexagonal shaft, a series of knife-carriers mounted on said shaft in groups of three each formed with surfaces adapted to bear upon two adjacent sides of said shaft and with inclined extremities, annular retainers formed with inclined surfaces adapted to engage the inclined surfaces of said knife-carriers and with plane surfaces normal to said shaft axis adapted for mutual engagement in symmetrical arrangement in pairs between said groups of knife-carriers, means to retain the assembly of said groups of knife-carriers and said pairs of retainers in compressive stress, and knives fixed upon said knife-carriers to wipe said stationary knife.

3. The combination in a lawn-mower of a stationary knife with a coacting rotary cutter-head comprising, a relatively heavy hexagonal shaft, a series of knife-carriers mounted on said shaft in groups of three each formed with surfaces adapted to bear upon two adjacent sides of said shaft and with inclined extremities, annular retainers formed with inclined surfaces adapted to engage the inclined surfaces of said knife-carriers and with plane surfaces normal to said shaft axis adapted for mutual engagement in symmetrical arrangement in pairs between said groups of knife-carriers, means to retain the assembly of said groups of knife-carriers and said pairs of retainers in compressive stress, and flexible knives fixed upon said knife-carriers formed with the cutting edges thereof normally disposed in a cylindrical surface passing through the cutting edge of said stationary knife.

4. The combination in a lawn-mower of a stationary knife with a coacting rotary cutter-head comprising, a relatively heavy hexagonal shaft, a series of knife-carriers mounted on said shaft in groups of three each formed with surfaces adapted to bear upon two adjacent sides of said shaft and with inclined extremities, annular retainers formed with inclined surfaces adapted to engage the inclined surfaces of said knife-carriers and with plane surfaces normal to said shaft axis adapted for mutual engagement in symmetrical pairs between said groups of knife carriers, means to retain the assembly of said groups of knife-carriers and said pairs of retainers therebetween in compressive stress, and relatively light flexible knives formed with elliptical cutting edges fixed upon said knife-carriers in a manner to provide for the disposition of said cutting edges in a cylindrical surface in staggered and alternately inclined correlation.

JAMES D. BOBBROFF.